(12) United States Patent
Keidar et al.

(10) Patent No.: US 8,396,133 B2
(45) Date of Patent: Mar. 12, 2013

(54) SYNCHRONIZING VIDEO FRAMES WITHOUT HARDWARE TIMESTAMPS

(75) Inventors: Ron Keidar, Haifa (IL); Nela Gurevich, Kiriyat Yam (IL); Constantine Elster, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 660 days.

(21) Appl. No.: 12/427,479

(22) Filed: Apr. 21, 2009

(65) Prior Publication Data
US 2010/0266050 A1  Oct. 21, 2010

(51) Int. Cl.
H04N 7/26 (2006.01)
H04L 7/00 (2006.01)
(52) U.S. Cl. ............ 375/240.25; 375/354; 375/267
(58) Field of Classification Search .............. None
See application file for complete search history.

(56) References Cited

U.S. PATENT DOCUMENTS

| | | | |
|---|---|---|---|
| 5,565,924 A | 10/1996 | Haskell et al. | |
| 6,169,843 B1 | 1/2001 | Lenihan et al. | |
| 6,598,172 B1* | 7/2003 | VanDeusen et al. | 713/503 |
| 2001/0024429 A1* | 9/2001 | Sekine et al. | 370/331 |
| 2004/0008661 A1* | 1/2004 | Myles et al. | 370/350 |
| 2004/0010729 A1* | 1/2004 | Lockridge et al. | 713/500 |
| 2004/0109519 A1 | 6/2004 | Mizukami et al. | |
| 2004/0170159 A1* | 9/2004 | Kim et al. | 370/352 |
| 2006/0159028 A1* | 7/2006 | Curran-Gray et al. | 370/252 |
| 2006/0268713 A1* | 11/2006 | Lundstrom | 370/235 |
| 2007/0002852 A1* | 1/2007 | Pekonen et al. | 370/389 |
| 2007/0058628 A1* | 3/2007 | Palnati et al. | 370/390 |
| 2008/0126825 A1 | 5/2008 | Yang | |
| 2008/0172708 A1* | 7/2008 | Perry et al. | 725/110 |

FOREIGN PATENT DOCUMENTS

| | | |
|---|---|---|
| KR | 1020010042630 A | 5/2001 |
| WO | WO2007010779 | 1/2007 |
| WO | WO2008010229 | 1/2008 |

OTHER PUBLICATIONS

International Search Report and Written Opinion—PCT/US2010/031777, International Search Authority—European Patent Office—Sep. 2, 2010.
ISO/IEC 13818-1:2000(E), Annex D, "Information Technology-Generic coding of moving pictures and associated audio information: Systems" (2000).

* cited by examiner

*Primary Examiner* — Thai Tran
*Assistant Examiner* — Sunghyoun Park
(74) *Attorney, Agent, or Firm* — Steven Thiel; Elaine H. Lo (57) ABSTRACT

A system and method for decoding multimedia video is described. Particularly, a system and method for determining the time of arrival of packets, without a hardware interface, is disclosed. As described herein, the time of arrival for each packet may be derived by extrapolating information from the arrival of a frame boundary and the specifications of the transmission standard. This permits the calculation of drift between the encoder and decoder clocks and consequently the more accurate decoding of the transmission.

21 Claims, 7 Drawing Sheets

SYNCHRONIZING VIDEO FRAMES WITHOUT HARDWARE TIMESTAMPS

BACKGROUND

1. Field of the Invention

Embodiments as described herein relate to data communication. More particularly, these embodiments relate to digital video and audio processing and an improved system and method for the decoding of digital video and audio data.

2. Description of the Related Art

Digital multimedia data such as video and music can be transmitted to multiple receivers, such as wireless telephones or television, for playing of the multimedia by users of the receivers. The multimedia can be formatted in accordance with a number of different video encoding standards. The Moving Picture Experts Group (MPEG), for example, has developed a number of standards such as that described in MPEG-2 part 2. Other encoding standards include H.261/H.263 and the latest H.264/AVC.

Video encoding standards achieve increased transmission rates by encoding data in a compressed fashion. Compression can reduce the overall amount of data that needs to be transmitted for effective transmission of image frames. The H.264 standards, for example, utilize graphics and video compression techniques designed to facilitate video and image transmission over a narrower bandwidth than could be achieved without the compression. In particular, the MPEG standards incorporate video encoding techniques that utilize similarities between successive image frames, referred to as temporal or interframe correlation, to provide interframe compression. The interframe compression techniques exploit data redundancy across frames by converting pixel-based representations of image frames to motion representations. In addition, the video encoding techniques may utilize similarities within image frames, referred to as spatial or intraframe correlation, in order to achieve intra-frame compression in which the spatial correlation within an image frame can be further compressed. The intraframe compression is typically based upon conventional processes for compressing still images, such as spatial prediction and discrete cosine transform (DCT) encoding.

The MPEG compression technique incorporates video encoding techniques that utilize similarities between successive image frames, referred to as temporal or interframe correlation, to provide interframe compression. The interframe compression techniques exploit data redundancy across frames by converting pixel-based representations of image frames to motion representations. Encoding breaks each picture into blocks called "macro blocks", and then searches neighboring pictures for similar blocks. If a match is found, instead of storing all of the entire block, the system stores a much smaller vector that describes the movement (or lack thereof) of the block between pictures. In this way, efficient compression is achieved.

To support these compression techniques, many digital video devices include an encoder for compressing digital video sequences, and a decoder for decompressing the digital video sequences. In many cases, the encoder and decoder comprise an integrated encoder/decoder (CODEC) that operates on blocks of pixels within frames that define the sequence of video images. For each macro block in the image frame, the encoder searches macroblocks of the immediately preceding video frame to identify the most similar macroblock, and encodes the difference between the macro blocks for transmission, along with a motion vector that indicates which macro block from the previous frame was used for encoding.

The decoder of a receiving device receives the motion vector and encoded differences, and performs motion compensation to generate video sequences.

Proper conversion of the frames back into video and audio relies upon proper timing between the encoder at the transmitter and the decoder at the receiver. The receiver is typically provided with information relating to when a frame was encoded by the transmitter, with respect to the collection of frames, so that a frame can be properly synchronized and presented to the user at the receiver. MPEG2 TS is part of a standard describing a transport layer for the MPEG2 compression technique. MPEG2 TS accommodates the synchronization between encoder and decoder by recording the encoder's local clock time into the packets of compressed frames as timestamps. These timestamps are known as the Program Clock Reference, or PCRs (See ISO/IEC 13818-1, Annex D, incorporated in its entirety herein by reference). PCRs are thus a form of encoder timestamp. PCRs are introduced by the System Time Clock (STC) at the transmitter and form the master clock referenced by the decoder to determine when video and audio are to be decompressed and displayed.

The PCR value may not always be accurate, however. Imperfections in either the receiver clock or transmitter clock, resulting from operating conditions or inherent defects, will result in drift between the two clocks. The decoder at the receiver will eventually experience underrun if its clock is faster, or overrun, if its clock is slower than the clock at the transmitter. To prevent overrun and underrun, the receiver calculates the drift between its clock and the clock of the transmitter. The receiver then compensates for this drift when decoding subsequent frames.

In many devices, a hardware interface in the transport layer, known as the transport stream interface (TSIF), timestamps each packet containing a PCR value once it is received. This timestamp can then be used with the PCR contained in the packet to extrapolate the drift between the encoder and decoder clocks. However, some mobile device interfaces do not support TSIF. Without an alternative method for clock synchronization, these devices will be incompatible with the ISDB-T, DVB-T, T-DMB, and many other standards.

SUMMARY OF THE INVENTION

In some embodiments, a system for determining the drift between the clocks of an encoder and decoder comprising: a receiver configured to receive a plurality of frames, with each frame comprising one or more packets of data, wherein at least two of the packets comprise an encoder timestamp; a controller configured to produce an interrupt upon receipt of each frame; a first module configured to create decoder timestamps for said one or more packets of data in response to the interrupt; and a second module configured to determine drift by calculating the difference between the encoder timestamps and decoder timestamps.

In some embodiments, a method for determining the drift between the clocks of an encoder and decoder comprising: receiving a plurality of frames, wherein each of said frames comprises one or more packets of data, and at least two of the packets of data comprise an encoder timestamp; producing an interrupt upon receipt of at least one of said frames; creating a decoder timestamp for the one or more packets in response to the production of the interrupt; and determining drift based on the difference between the encoder timestamps and decoder timestamps.

In some embodiments, a system for determining the drift between the clocks of an encoder and decoder, comprising: means for receiving configured to receive a plurality of framing means, wherein each of said framing means comprises one or more means for packaging data, wherein at least two of said means for packaging data comprise a means for encoder timestamping; means for producing an interrupt upon receipt of said framing means; a means for creating a means for decoder timestamping for said one or more data packaging means in response to the interrupt; and a means for determining drift by calculating the difference between the encoder timestamping means and the decoder timestamping means.

In some embodiments, a computer readable medium comprising a computer readable program code adapted to be executed to perform a method comprising: receiving a plurality of frames, wherein each of said frames comprises one or more packets of data, and at least two of the packets of data comprise an encoder timestamp; producing an interrupt upon receipt of at least one of said frames; creating a decoder timestamp for the one or more packets in response to the production of the interrupt; and determining drift based on the difference between the encoder timestamps and decoder timestamps.

BRIEF DESCRIPTION OF THE DRAWINGS

The features, objects, and advantages of the disclosed embodiments will become more apparent from the detailed description set forth below when taken in conjunction with the drawings in which like reference characters identify correspondingly throughout and wherein.

DETAILED DESCRIPTION

Embodiments of the invention include systems and methods for decoding multimedia video. One embodiment provides a system and method for determining "drift" between an encoder clock and a decoder clock when a hardware timestamp, such as that provided by TSIF, is unavailable. In particular, certain embodiments determine the arrival time of PCR containing packets without use of a hardware interface. In this embodiment, the system extrapolates the arrival time of the packet by reference to a transmission frame boundary and characteristics of the transmission specification. In one embodiment, the receipt of a transmission frame results in a software interrupt being generated. The receiver monitors for the software interrupt and can thereafter determine the arrival time of the packets within the received frame. These arrival times are then associated with each packet in the frame and stored in memory. The arrival times are subsequently used, in conjunction with the PCR value that is sent with the frame, to determine the drift between the encoder clock and the decoder clock.

The following detailed description is directed to certain specific embodiments. However, the teachings herein can be applied in a multitude of different ways. In this description, reference is made to the drawings wherein like parts are designated with like numerals throughout. The embodiments may be implemented in any device, as discussed below. Particularly, embodiments may be implemented into devices that are configured to receive an MPEG2 transport stream having OFDM frame interrupts, but one skilled in the art will readily recognize that other block-based encoding systems and frame-based transmission systems may be used as well.

Several international standards for television use MPEG2 as their presentation layer in the OSI model. The Integrated Services Digital Broadcasting Terrestrial for Terrestrial Television Broadcasting (ISDB-T), for example, adopted by Japan and Brazil, uses MPEG2. Similarly, Terrestrial Digital Multimedia Broadcasting (T-DMB) used in Korean Broadcasts and the Digital Video Broadcasting-Terrestrial (DVB-T) used in Europe, implement MPEG2. In each of these systems an MPEG2 Transport Stream is re-multiplexed and arranged into data groups (Data Segments) prior to OFDM (Orthogonal Frequency Division Multiplexing) framing. OFDM is involved at all 7 OSI model layers in DVB-T, T-DMB and ISDB-T.

OFDM provides multiple access communication, where different users are allocated different orthogonal tones within a frequency bandwidth to transmit data at the same time. Information transmitted over these channels is divided into packets, or frames. Each packet can be defined to include various fields, depending on the particular implementation.

As discussed more fully below, certain embodiments are directed to an MPEG2 TS PCR timestamp system, that does not rely on a hardware interface, such as TSIF, in the transport layer. The system is advantageous for use in devices that are compatible with well-known standards, such as ISDB-T and T-DMB, using both MPEG2 Transport Stream layer (MPEG2 TS) and OFDM frames. In one embodiment, the system aligns the clock of a TV decoder at a receiving device with the encoder clock at the transmitter. In this embodiment, the frame interrupt, such as an OFDM frame interrupt can be used to extrapolate the time of arrival of each TS packet. Embodiments implementing this system are described in more detail below.

Figure 1:
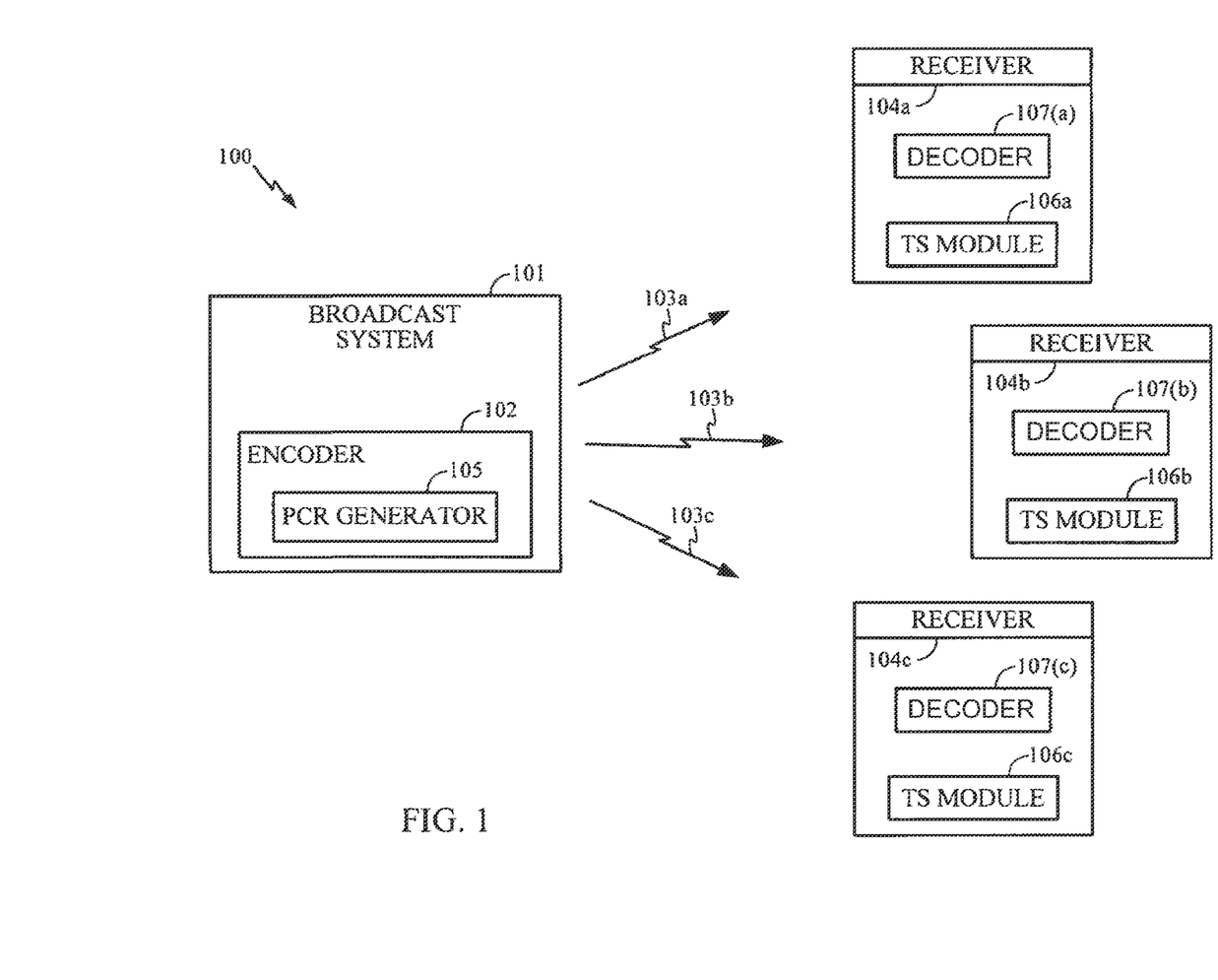
FIG. 1 is a top-level block diagram of the broadcasting and data communication system used in one embodiment of the invention.

FIG. 1 illustrates a top-level block diagram of a broadcasting and data communication system 100. In this embodiment, a broadcast system 101 encodes data using encoder 102 which in turn uses PCR generator 105. PCR generator 105 periodically inserts PCR timestamps into the packets transmitted on channels 103(*a-c*) to each of receivers 104(*a-c*). Channels 103(*a-c*) may be frequency channels as in a multiplexed channel, such as an OFDM implementation. For example, broadcast system 101 may, in various embodiments, be a DVB-T, T-DMB or ISDB-T system. Receivers 104(*a-c*) may be a cell phone, personal data system, home computer, or any other device known in the art capable of receiving signals from broadcast system 101. Each receiver 104(*a-c*) possesses a decoder 107(*a-c*) which decompresses the transmissions and then displays the data to a user. Decoders 107(*a-c*) employ timestamp modules 106(*a-c*) to recover the time of arrival of each PCR containing packet. This permits determination of the drift between the clocks (not pictured) of the encoder 102 and each of the decoders 107(a-c).

Figure 2:
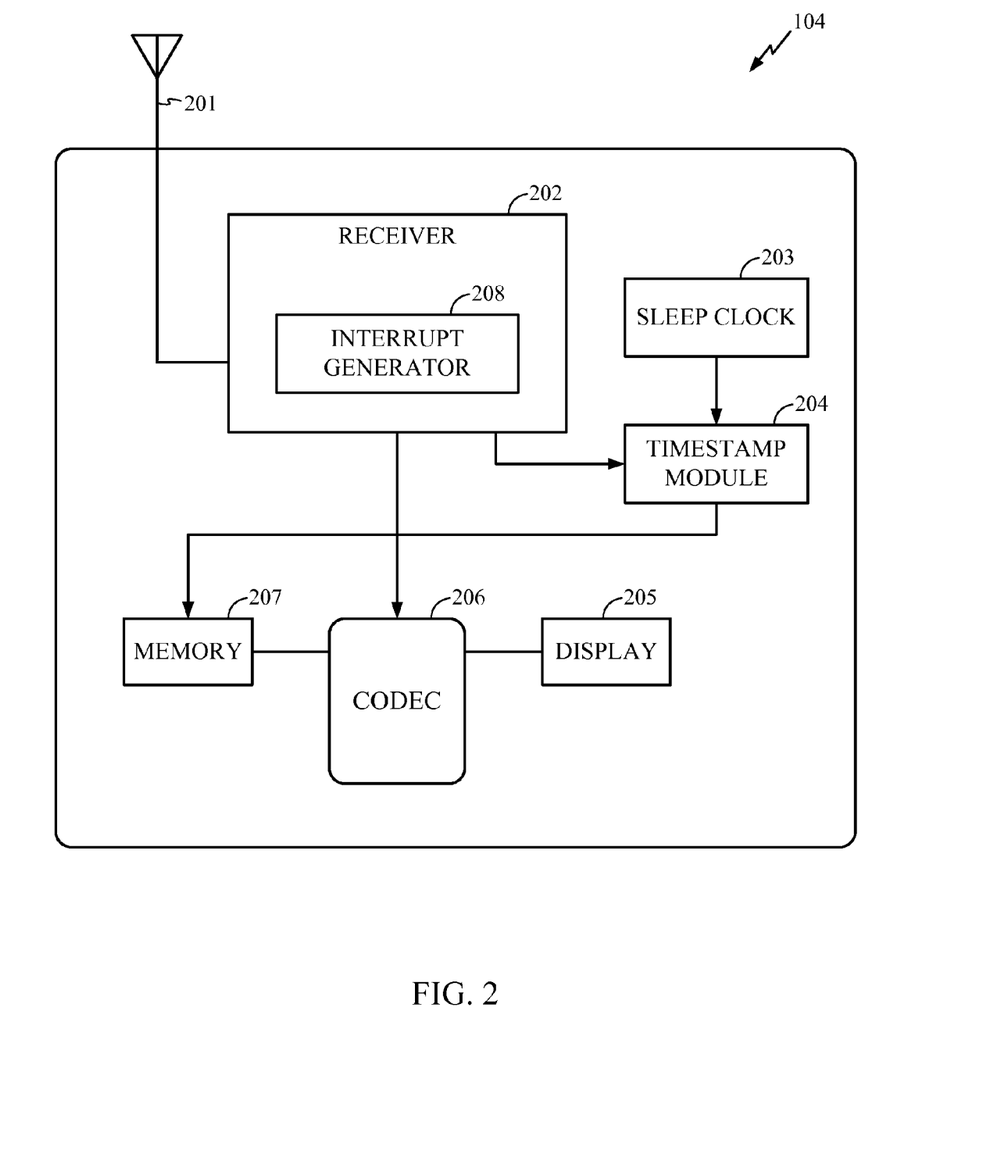
FIG. 2 is a schematic diagram of a receiver in one embodiment of the invention, implementing the timestamp module.

FIG. 2 illustrates a schematic diagram of one of the receivers 104a-c of FIG. 1. In this embodiment, transmissions are received by antenna 201, although one skilled in the art will readily recognize numerous methods for receiving transmissions, i.e. fiber optics, cable, etc. As input/output 202 in the receiver 104a acquires each OFDM frame from the antenna 201, interrupt generator 208 provides a software interrupt that notifies the timestamp module 204 that a new frame has arrived. Timestamp module 106a in turn refers to the clock 203 to mark the time of arrival of the frame boundary from the incoming OFDM frame. One skilled in the art will readily recognize that numerous other clocks may be used to record the arrival time of the frame, so long as they provide consistent increments of sufficient resolution. The module 106a then pairs the arrival time and a unique identifier for the particular frame boundary together in a memory 207. This data can be used later to calculate the drift of any particular packet within the received frame, as will be discussed in more detail below.

The input/output 202 also provides the frame to the decoder 107a, which begins decoding the received packets using memory 207 and displaying their contents via display 205. One skilled in the art will readily recognize that rather than displaying the contents, the packets might be stored or re-encoded. During this decoding, decoder 107a may refer to the paired frame numbers and arrival times to extrapolate the time of arrival of each packet.

Figure 3:
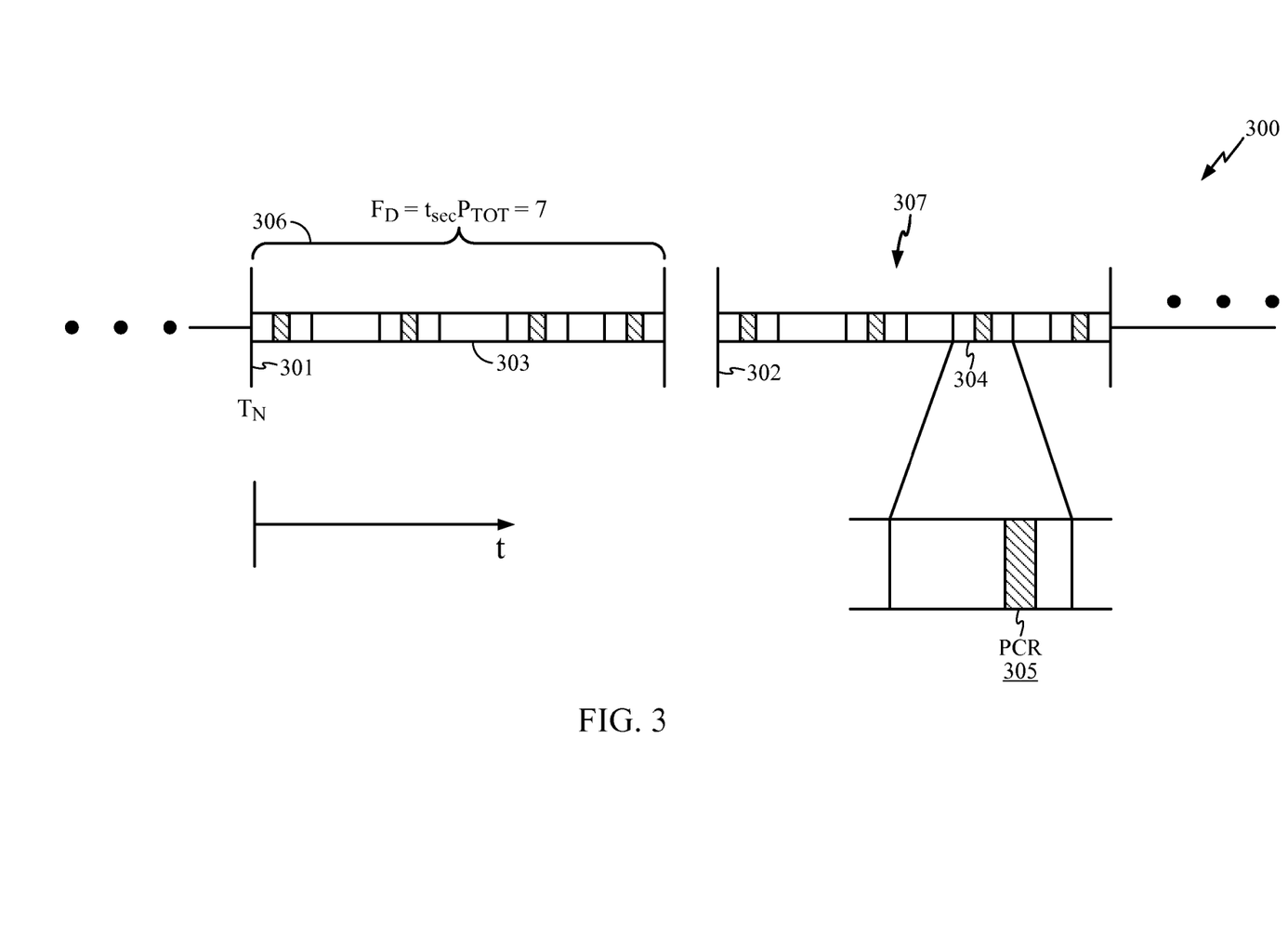
FIG. 3 is a breakdown of an OFDM frame containing TS packets holding PCR values.

FIG. 3 illustrates a diagram of a series of OFDM frames and the TS packets they contain. In this example, OFDM frames 306 and 307 arrive in succession preceded and succeeded by series of similar OFDM Frames. Each OFDM frame contains an integer number of packets $P_{tot}$. In this example, $P_{tot}$ is arbitrarily chosen to be 7 for illustration purposes. $P_{tot}$ is determined by the communications standard or OFDM configuration in use. $P_{tot}$ will usually be in the range of 24-168 packets. $F_d$ is the duration of a frame and is here arbitrarily given as $t_{sec}$. For a given standard, a fixed number of TS packets will contain a PCR, or similar encoder timestamp, 305 in each frame.

Figure 4:
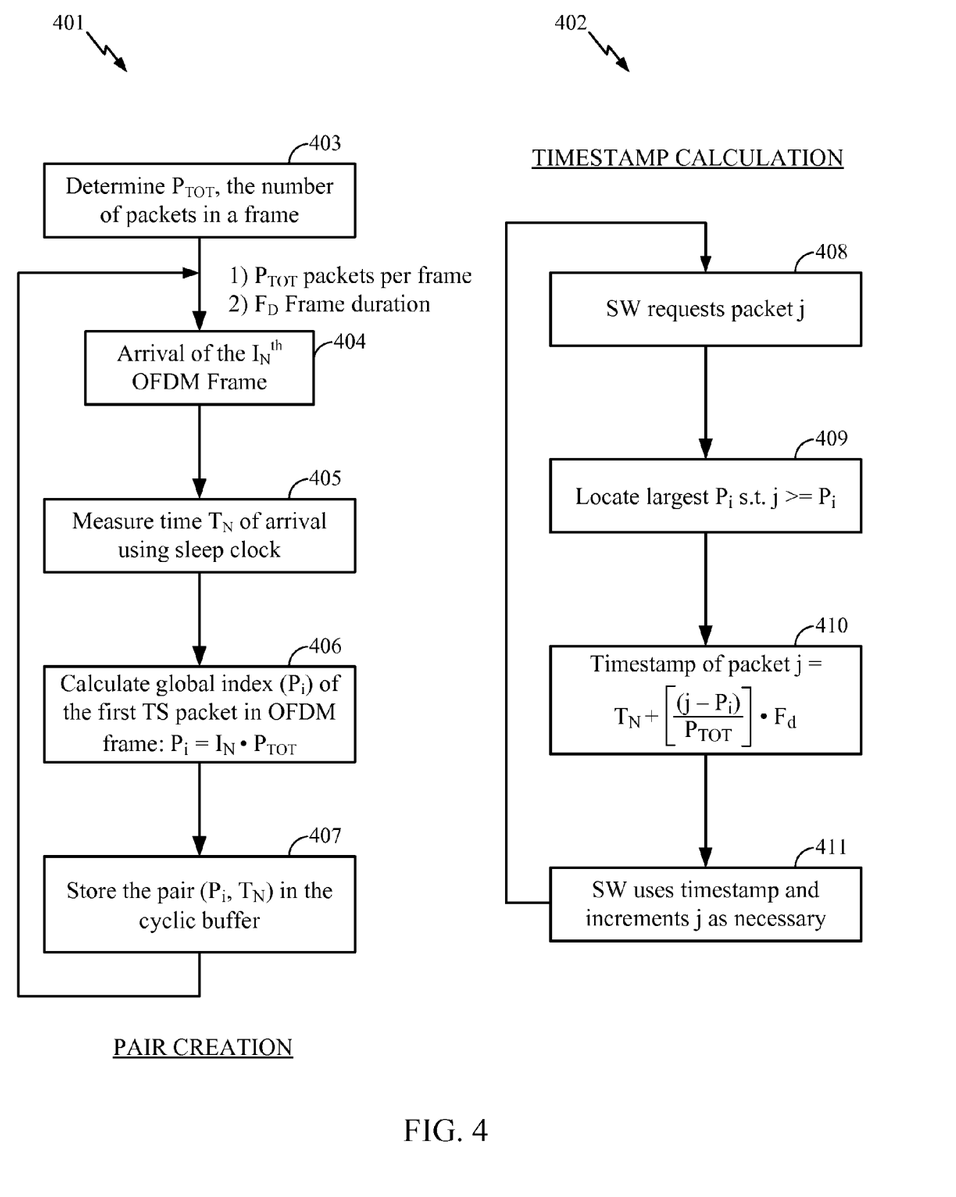
FIG. 4 is a flow diagram of the packet-OFDM timestamp pair creation process and the subsequent individual packet timestamp creation process.

With reference to FIGS. 3, 4A and 4B, the operation of the timestamp module and subsequent timestamp calculation as implemented in certain embodiments of the present invention will be described in detail. The embodiment comprises two processes which may be implemented in a first and second module: pair creation 401 (FIG. 4A) and subsequent calculation of individual packet timestamps 402 (FIG. 4B). Pair creation 401 will be described first, and then the timestamp calculation 402.

Pair Creation

Referring to FIG. 4A, the process 401 initially determines $P_{tot}$, the number of packets for a frame, and $F_d$ the time duration of a single frame, based on the particular transmission standard being used. At state 404 an OFDM frame arrives and the system notes the identifying number $I_n$ of the Frame. For example, in the first frame the value $I_n=1$, whereas in the twelfth frame the value $I_n=12$, etc. The process 401 then moves to state 405 wherein the system refers 405 to the sleep clock, or other suitable clock, to determine the time of arrival T, of the received OFDM frame. In the next step 406, the global index $P_i$ of the first packet in the frame is calculated. The global index $P_i$ is the index with respect to ALL packets received by the system. Thus, if $P_{tot}$ were 7 and $I_n$ were 3, then $P_i$ would be 21 ($P_i=I_n*P_{tot}$). The system then stores the pair $P_i$, $T_n$ into a buffer in memory (such as a cyclic buffer) at a state 407 for subsequent use in clock drift calculations. Once the current frame has been stored in memory at state 407, the process 401 returns to state 404 to receive a subsequent OFDM frame.

Decoder Timestamp Calculation

Referring now to FIG. 4B, once the decoder has need of a particular packet in order to decode a video stream, a decoder timestamp calculation is performed. The decoder software first makes a request for a particular packet having global index j at a state 408. Typically, packet with index j will contain a PCR. The system then locates the largest stored packet pair from the cyclic buffer, wherein the pair has a global index $P_i$ less than j but as large as possible at a state 409. Packet with index $P_i$ may or may not contain a PCR. During the state 409 the process 402 locates the first packet in the same frame as packet j. If j is the first packet in its frame, then $P_i=j$. The system then calculates the timestamp of packet j at a state 410. This calculation is performed using the relationship:

$$\text{Timestamp}=T_n+[(j-Pi)/P_{tot}]*F_d$$

The term "$[(j-P_i)/P_{tot}]$" effectively determines what proportion of the frame precedes the packet. This proportion is used to find the time difference between the frame's initial arrival and the packet's arrival by taking the same proportion of the total frame's time duration. Adding this to the time of arrival of the first packet in the frame produces the extrapolated time of arrival of the packet, i.e. the decoder timestamp. Thus, by knowing the total duration of the frame, the arrival time of the frame and the proportion of the frame where the packet is found, one can determine the arrival time of the packet within the frame. The system then uses this timestamp in decoding process, increments j and proceeds 411.

Drift Calculation

Having determined the time of arrival of each packet that contains a PCR within a frame, the drift may be subsequently calculated as follows.

Referring to the derived timestamp for the ith packet as $TS_i$, $$\Delta TS=TS_i-TS_{i-D},$$

where D comprises an arbitrary offset greater than one. Referring to the PCR for the ith packet as $PCR_i$, $$\Delta PCR=PCR_i-PCR_{i-D},$$

Then, $$\text{Drift}=\Delta PCR-\Delta TS$$

One skilled in the art will readily recognize that as more than one PCR containing packet may exist in a frame, the approximate drift may be derived by averaging the calculation across several packets, or even across several frames. Thus, in one embodiment the system computes a difference in the encoder timestamps of a first packet and a second packet to determine a first value. Once that value is known, the system can compute the difference in the decoder timestamps of the first packet and the second packet to determine a second value. Then the system can calculate the difference between the first and second values to get an average drift value across several packets.

The offset D may preferably be chosen so as to always select a packet in a different frame than the ith packet, although this need not be the case.

EXAMPLES

Below are provided the parameters for various implementations of certain of the above described embodiments. The resulting drift rates are provided in FIGS. 5-9.

| Example 1 - 30 Minute Japan Live Broadcast, Channel 22 | |
| --- | --- |
| Platform: | Platform A |
| Clock source: | Oscillator |
| Modulation Type = | QPSK |
| Tx Mode = | 3 |
| Guard Interval = | ⅛ |
| TS Packets per frame ($P_{tot}$) = | 64 |
| OFDM frame expected duration ($F_d$) = | 231.336 ms |
| #PCR/sec = | 4.32 |
| Average: OFDM frames arrival interval: | 231.3387 ms (Expected: 231.336 ms) |

Figure 5:
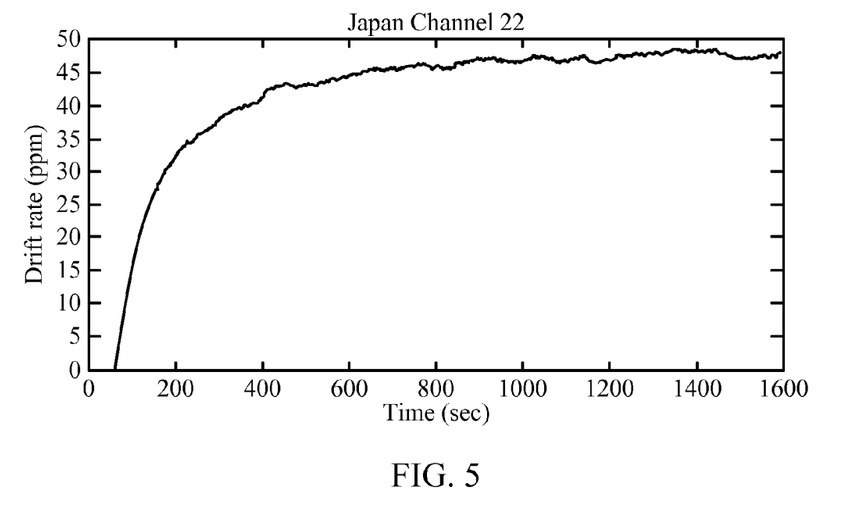
FIG. 5 is a graph of the drift rate over time as calculated by one embodiment of the invention in a first exemplary implementation.

FIG. 5 plots the resulting drift rate between the source and receiving clocks for Example 1, as calculated by an embodiment of the invention as described supra.

| Example 2 - 30 Minute Playback of LockStock Movie DVD (Rhozet Carbon Coder was used in order to transcode the DVD into H.264 video and AAC ADTS audio, encapsulated in an MPEG2 TS) | |
| --- | --- |
| Platform: | Platform A |
| Clock source: | Oscillator |
| Modulation Type = | QPSK |
| Tx Mode = | 3 |
| Guard Interval = | ⅛ |
| TS Packets per frame ($P_{tot}$) = | 64 |
| OFDM frame expected duration ($F_d$) = | 231.336 ms |
| #PCR/sec = | 25.6 |
| Average: OFDM frames arrival interval: | 231.3396 ms (Expected: 231.336 ms) |

Figure 6:
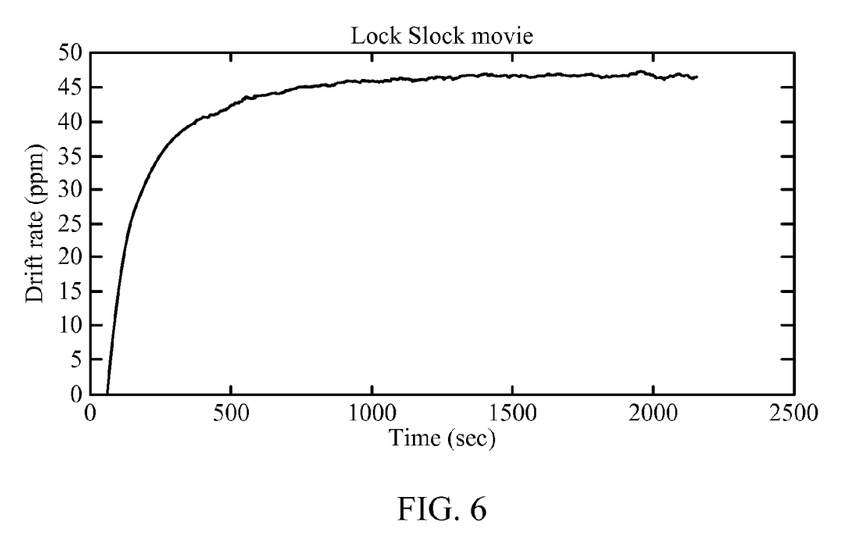
FIG. 6 is a graph of the drift rate over time as calculated by one embodiment of the invention in a second exemplary implementation.

FIG. 6 plots the resulting drift rate between the source and receiving clocks for Example 2, as calculated by an embodiment of the invention as described supra.

| Example 3 - 40 Minute Japan Live Broadcast, Channel 22 | |
| --- | --- |
| Platform: | Platform A |
| Clock source: | Oscillator |
| Modulation Type = | 16QAM |
| Tx Mode = | 3 |
| Guard Interval = | ¼ |
| TS Packets per frame ($P_{tot}$) = | 168 |
| OFDM frame expected duration ($F_d$) = | 257.03 ms |
| #PCR/sec = | 4.32 |
| Average: OFDM frames arrival interval: | 257.0428 ms (Expected: 257.04 ms) |

Figure 7:
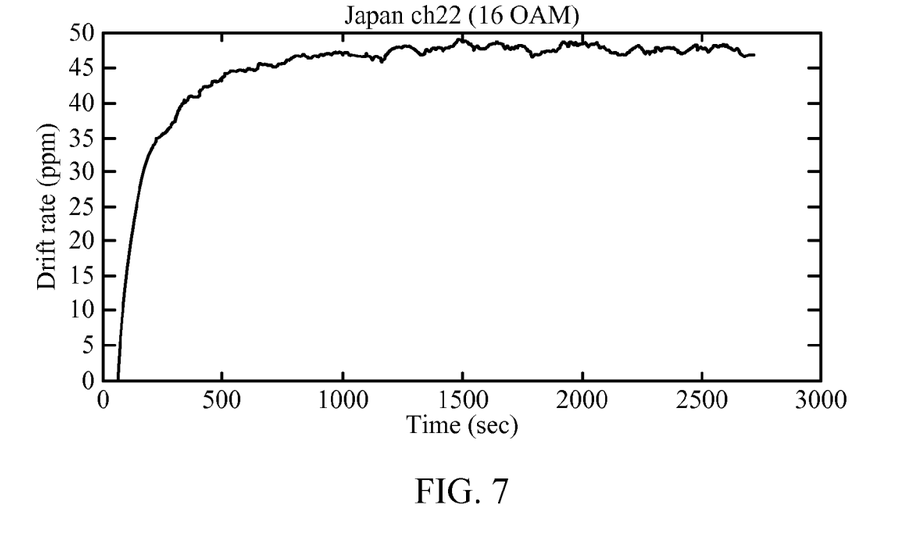
FIG. 7 is a graph of the drift rate over time as calculated by one embodiment of the invention in a third exemplary implementation.

FIG. 7 plots the resulting drift rate between the source and receiving clocks for Example 3, as calculated by an embodiment of the invention as described supra.

| Example 4 - LockStock Movie Playing on FFA | |
| --- | --- |
| Platform: | Platform B |
| Clock source: | N/A |
| Modulation Type = | QPSK |
| Tx Mode = | 3 |
| Guard Interval = | ⅛ |
| TS Packets per frame ($P_{tot}$) = | 64 |
| OFDM frame expected duration ($F_d$) = | 231.336 ms |
| #PCR/sec = | 25.6 |
| Average: OFDM frames arrival interval: | 231.3396 ms (Expected: 231.336 ms) |

Figure 8:
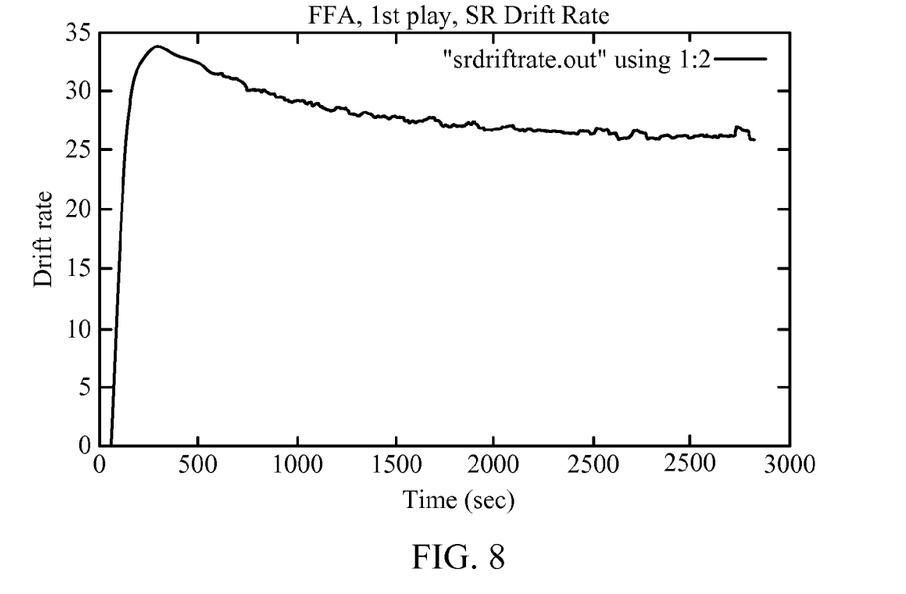
FIG. 8 is a graph of the drift rate over time as calculated by one embodiment of the invention for the first playback in a fourth exemplary implementation.
Figure 9:
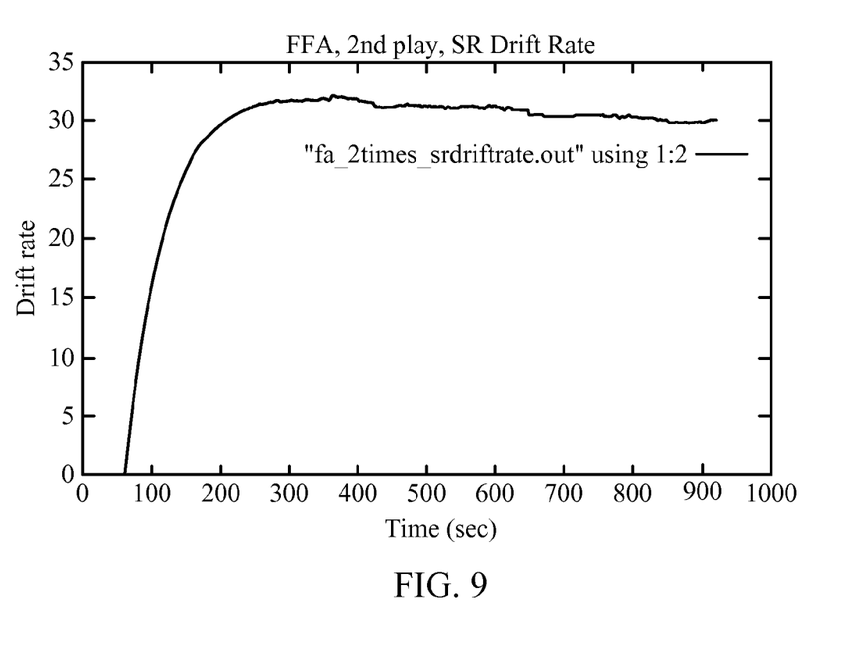
FIG. 9 is a graph of the drift rate over time as calculated by one embodiment of the invention for the second playback in a fourth exemplary implementation.

FIGS. 8 and 9, plot the resulting drift rate between the source and receiving clocks for both the first and second playbacks of the movie in Example 4, calculated in each case by an embodiment of the invention as described supra.

Platform A was an open platform, wherein the components were dispersed and not enclosed. Platform B, in contrast, was a development platform in the shape of a real mobile phone. As can be seen from FIGS. 5-7, drift rates between the two platforms were non-identical. This can be explained by the greater heating of the clock inside enclosed Platform B as opposed to open-air Platform A. When the clock is already warm, the drift rate behaves as expected and does not change the value significantly with time. While it is heating, however, significant drift may occur. As the clock on Platform A is in "open air", it does not heat as badly as on Platform B (max peak of ~34 sec for the second platform whereas Example 1 has a max peak ~47 sec). One would expect a clock that is already warm to create a different drift rate from a "cold" clock. As shown in FIGS. 8-9, a clock that has already become warm will in fact have a different drift rate on a subsequent playback. As shown by these diagrams, this embodiment successfully characterized the drift behavior between the clocks.

The techniques described in this disclosure may be implemented in hardware, software, firmware, or any combination thereof. Any features described as units or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software units or hardware units configured for encoding and decoding, or incorporated in a combined video encoder-decoder (CODEC). Depiction of different features as units is intended to highlight different functional aspects of the devices illustrated and does not necessarily imply that such units must be realized by separate hardware or software components. Rather, functionality associated with one or more units may be integrated within common or separate hardware or software components.

Various embodiments of this disclosure have been described. These and other embodiments are within the scope of the following claims.

What is claimed is:

1. A system for determining a drift between clocks of an encoder and a decoder comprising:

a receiver configured to receive a plurality of frames, with each of the plurality of frames comprising one or more packets of data, wherein at least two of the packets of data each comprise an encoder timestamp;

a controller configured to produce an interrupt upon the receiver receiving each of the plurality of frames;

a first module configured to create a decoder timestamp for each of said at least two of the packets of data in response to the interrupt produced upon the receiver receiving the corresponding frame of the plurality of frames comprising the respective packet of data, using an arrival time of the frame, a duration of the frame, and a proportion of the frame that precedes the packet of data; and a second module configured to determine the drift by calculating a difference between the encoder timestamps and the decoder timestamps.

2. The system of claim 1, wherein the first module and the second module comprise part of a same module.

3. The system of claim 1, wherein to create the decoder timestamp, the first module is configured to determine a location of the packet of data within the frame.

4. The system of claim 1, further comprising a buffer configured to store the decoder timestamps.

5. The system of claim 1, wherein the receiver comprises a wireless transmission receiver.

6. The system of claim 1, wherein the controller comprises an OFDM frame interrupt handler.

7. The system of claim 1, wherein said first module comprises a sleep timer.

8. The system of claim 1, wherein said system comprises a cellular telephone.

9. The system of claim 1, wherein said plurality of frames comprises orthogonal frequency division multiplexing (OFDM) frames.

10. The system of claim 1, wherein the plurality of frames comprises compressed audio and video data.

11. The system of claim 10, wherein the compressed audio and video data conform to the Integrated Services Digital Broadcasting (ISDB) standard.

12. The system of claim 10, wherein the compressed audio and video data conform to the Terrestrial Digital Multimedia Broadcasting (T-DMB) standard.

13. The system of claim 1, wherein to calculate the difference between the encoder timestamps and the decoder timestamps, the second module is configured to:

compute a difference between the encoder timestamps of a first packet and a second packet of said at least two packets of data to determine a first value;

compute a difference between the decoder timestamps of the first packet and the second packet to determine a second value; and calculate a difference between the first and second values.

14. The system of claim 13, wherein the drift between the clocks of the encoder and the decoder comprises an average drift, and wherein to calculate the difference between the encoder timestamps and the decoder timestamps, the second module is further configured to:

compute a difference between the encoder timestamps of a third packet and a fourth packet of said at least two packets of data to determine a third value;

compute a difference between the decoder timestamps of the third packet and the fourth packet to determine a fourth value;

calculate a difference between the third and fourth values; and average the difference between the first and second values and the difference between the third and fourth values.

15. A method for determining a drift between clocks of an encoder and a decoder comprising:

receiving a plurality of frames, wherein each of said plurality of frames comprises one or more packets of data, and wherein two or more of the packets of data each comprise an encoder timestamp;

producing an interrupt upon receiving at least one of said plurality of frames;

creating a decoder timestamp for each of the two or more of the packets of data in response to producing the interrupt upon receiving the corresponding frame of the at least one of said plurality of frames comprising the respective packet of data, using an arrival time of the frame, a duration of the frame, and a proportion of the frame that precedes the packet of data; and determining the drift based on a difference between the encoder timestamps and the decoder timestamps.

16. A system for determining a drift between clocks of an encoder and a decoder, comprising:

means for receiving a plurality of frames, wherein each of the plurality of frames comprises one or more data packets, and wherein at least two of the data packets each comprise an encoder timestamp;

means for producing an interrupt upon receiving each of the plurality of frames;

means for creating a decoder timestamp for each of the at least two of the data packets in response to the interrupt produced upon receiving the corresponding frame of the plurality of frames comprising the respective data packet, using an arrival time of the frame, a duration of the frame, and a proportion of the frame that precedes the data packet; and means for determining the drift by calculating a difference between the encoder timestamps and the decoder timestamps.

17. The system of claim 16, wherein the means for receiving the plurality of frames comprises a wireless receiver.

18. The system of claim 16, wherein the means for producing the interrupt comprises a controller.

19. The system of claim 16, wherein the means for creating the decoder timestamp comprises a sleep timer.

20. The system of claim 16, wherein the means for determining the drift comprises a processor.

21. A non-transitory computer readable storage medium comprising a computer readable program code adapted to be executed by a processor to determine a drift between clocks of an encoder and a decoder, wherein the program code causes the processor to:

receive a plurality of frames, wherein each of said plurality of frames comprises one or more packets of data, and wherein at least two of the packets of data each comprise an encoder timestamp;

produce an interrupt upon the processor receiving at least one of said plurality of frames;

create a decoder timestamp for each of the at least two of the packets of data in response to the processor producing the interrupt upon the processor receiving the corresponding frame of the at least one of said plurality of frames comprising the respective packet of data, using an arrival time of the frame, a duration of the frame, and a proportion of the frame that precedes the packet of data; and determine the drift based on a difference between the encoder timestamps and the decoder timestamps.

* * * * *